(12) United States Patent
Fox et al.

(10) Patent No.: US 11,856,897 B2
(45) Date of Patent: *Jan. 2, 2024

(54) CLIMATE CONTROL SYSTEM FOR A MUSHROOM GROWING APPLIANCE

(71) Applicant: Haier US Appliance Solutions, Inc., Wilmington, DE (US)

(72) Inventors: Steven Fox, Louisville, KY (US); Michael Wuttikorn Ekbundit, Mount Washington, KY (US); Daniel Carballo, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,908

(22) Filed: Jan. 10, 2022

(65) Prior Publication Data

US 2023/0217870 A1   Jul. 13, 2023

(51) Int. Cl.
| | |
|---|---|
| *A01G 18/69* | (2018.01) |
| *A01G 18/64* | (2018.01) |
| *F24F 7/007* | (2006.01) |
| *F24F 6/04* | (2006.01) |

(52) U.S. Cl.
CPC ............. *A01G 18/69* (2018.02); *A01G 18/64* (2018.02); *F24F 6/043* (2013.01); *F24F 7/007* (2013.01)

(58) Field of Classification Search
CPC ......... A01G 18/69; A01G 18/64; F24F 6/043; F24F 7/007
See application file for complete search history.

(56) References Cited

U.S. PATENT DOCUMENTS

| | | | | |
|---|---|---|---|---|
| 1,773,648 A | * | 8/1930 | Steves ................... | A01G 18/69 71/21 |
| 4,315,381 A | * | 2/1982 | Dvorin .................. | A01G 31/02 47/64 |

(Continued)

FOREIGN PATENT DOCUMENTS

| | | |
|---|---|---|
| CN | 208739703 U | 4/2019 |
| KR | 101687534 B1 | 12/2016 |

(Continued)

*Primary Examiner* — Monica L Perry
*Assistant Examiner* — Aaron M Rodziwicz
(74) *Attorney, Agent, or Firm* — Dority & Manning, P.A.

(57) ABSTRACT

A mushroom growing appliance includes a grow chamber defined within a cabinet and a climate control system for regulating the humidity and gas concentrations within the grow chamber. The climate control system includes a water reservoir positioned within the grow chamber for receiving water; a wicking filter positioned at least partially within the water reservoir for wicking the water into the wicking filter; a water supply system comprising a water storage tank that is mounted adjacent the cabinet above the water reservoir, the water storage tank fluidly coupled to the water reservoir through a water supply opening defined through the cabinet; a recirculation fan positioned adjacent the wicking filter for selectively urging a flow of recirculation air through the wicking filter and back into the grow chamber; and a fresh air fan positioned adjacent the wicking filter for urging a flow of fresh air through the wicking filter and into the grow chamber.

20 Claims, 6 Drawing Sheets

(56) References Cited

U.S. PATENT DOCUMENTS

| | | | | |
|---|---|---|---|---|
| 4,543,744 | A * | 10/1985 | Royster | A01G 9/24 |
| | | | | 47/60 |
| 5,283,974 | A * | 2/1994 | Graf, Jr. | A01G 9/16 |
| | | | | 47/60 |
| 5,578,113 | A * | 11/1996 | Glenn | B03C 3/155 |
| | | | | 96/57 |
| 5,833,137 | A * | 11/1998 | Liao | A01K 63/003 |
| | | | | 47/62 A |
| 5,946,853 | A * | 9/1999 | Jacobs | A01G 9/16 |
| | | | | 47/60 |
| 6,725,598 | B2 * | 4/2004 | Yoneda | A01G 31/02 |
| | | | | 47/60 |
| 6,748,696 | B1 | 6/2004 | Davidson | |
| 7,647,725 | B2 * | 1/2010 | Toto | A01G 18/69 |
| | | | | 47/1.1 |
| 8,443,546 | B1 * | 5/2013 | Darin | A01G 31/02 |
| | | | | 47/60 |
| 10,219,446 | B2 * | 3/2019 | Paquette | F21V 11/186 |
| D861,384 | S * | 10/2019 | Crutcher | A01G 31/02 |
| | | | | D6/661 |
| 10,667,469 | B2 * | 6/2020 | Van Gemert | A01G 9/245 |
| 11,083,139 | B2 * | 8/2021 | Bitetti | A01H 6/28 |
| 2021/0360872 | A1 * | 11/2021 | Tai | A01G 9/246 |

FOREIGN PATENT DOCUMENTS

| | | |
|---|---|---|
| KR | 101820408 B1 | 1/2018 |
| KR | 102059831 B1 | 12/2019 |

* cited by examiner

CLIMATE CONTROL SYSTEM FOR A MUSHROOM GROWING APPLIANCE

FIELD OF THE INVENTION

The present subject matter relates generally to mushroom growing appliances, and more particularly to climate control systems for mushroom growing appliances.

BACKGROUND OF THE INVENTION

Conventional growing appliances may include a cabinet defining a grow chamber for receiving herbs, plants, mushrooms, seedlings, fungi, or other plant material. These appliances may further include an environmental control system that maintains the grow chamber at a desired temperature or humidity. Certain growing appliances may also include artificial lighting systems that provide the light necessary for such plants to grow. However, conventional growing appliances have several drawbacks that prevent optimal grow environments for the items positioned therein.

For example, mushroom growing appliances are particularly susceptible to issues with mushroom spores. In this regard, during the cultivation of mushrooms, mushroom spores may be dropped or dislodged. These spores resemble fine dust particles that may cling to everything they touch including working components of the appliance. As these spores build up, they may cause issues with the operation of the mushroom growing appliance. For example, certain conventional mushroom growing appliances include a recirculation fan that is affected by the build-up of mushroom spores. In addition, conventional mushroom growing appliances fail to maintain desired humidity and gas concentrations for proper mushroom growth. For example, mushrooms may absorb oxygen from the air during growth and emit carbon dioxide, thereby resulting in elevated carbon dioxide levels. While fresh air might be added, this fresh air fan can dry out fruiting mushroom if not properly humidified.

Accordingly, an improved growing appliance that reduces the build-up of undesirable organic material and provides an improved growing environment is desired. More specifically, a mushroom growing appliance that has features for reducing the build-up of mushroom spores while maintaining desirable humidity levels for mushroom growth would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a mushroom growing appliance is provided a cabinet; a grow chamber defined within the cabinet; a water reservoir positioned within the grow chamber for receiving water; a water supply system comprising a water storage tank that is mounted adjacent the cabinet above the water reservoir, the water storage tank fluidly coupled to the water reservoir through a water supply opening defined through the cabinet; a wicking filter positioned at least partially within the water reservoir for wicking the water into the wicking filter; and a recirculation fan positioned adjacent the wicking filter for selectively urging a flow of recirculation air through the wicking filter and back into the grow chamber.

In another exemplary embodiment, a climate control system for a mushroom growing appliance is provided including a water reservoir positioned within the grow chamber for receiving water; a wicking filter positioned at least partially within the water reservoir for wicking the water into the wicking filter; a water supply system comprising a water storage tank that is mounted adjacent the cabinet above the water reservoir, the water storage tank fluidly coupled to the water reservoir through a water supply opening defined through the cabinet; a recirculation fan positioned adjacent the wicking filter for selectively urging a flow of recirculation air through the wicking filter and back into the grow chamber; and a fresh air fan positioned adjacent the wicking filter for urging a flow of fresh air through the wicking filter and into the grow chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
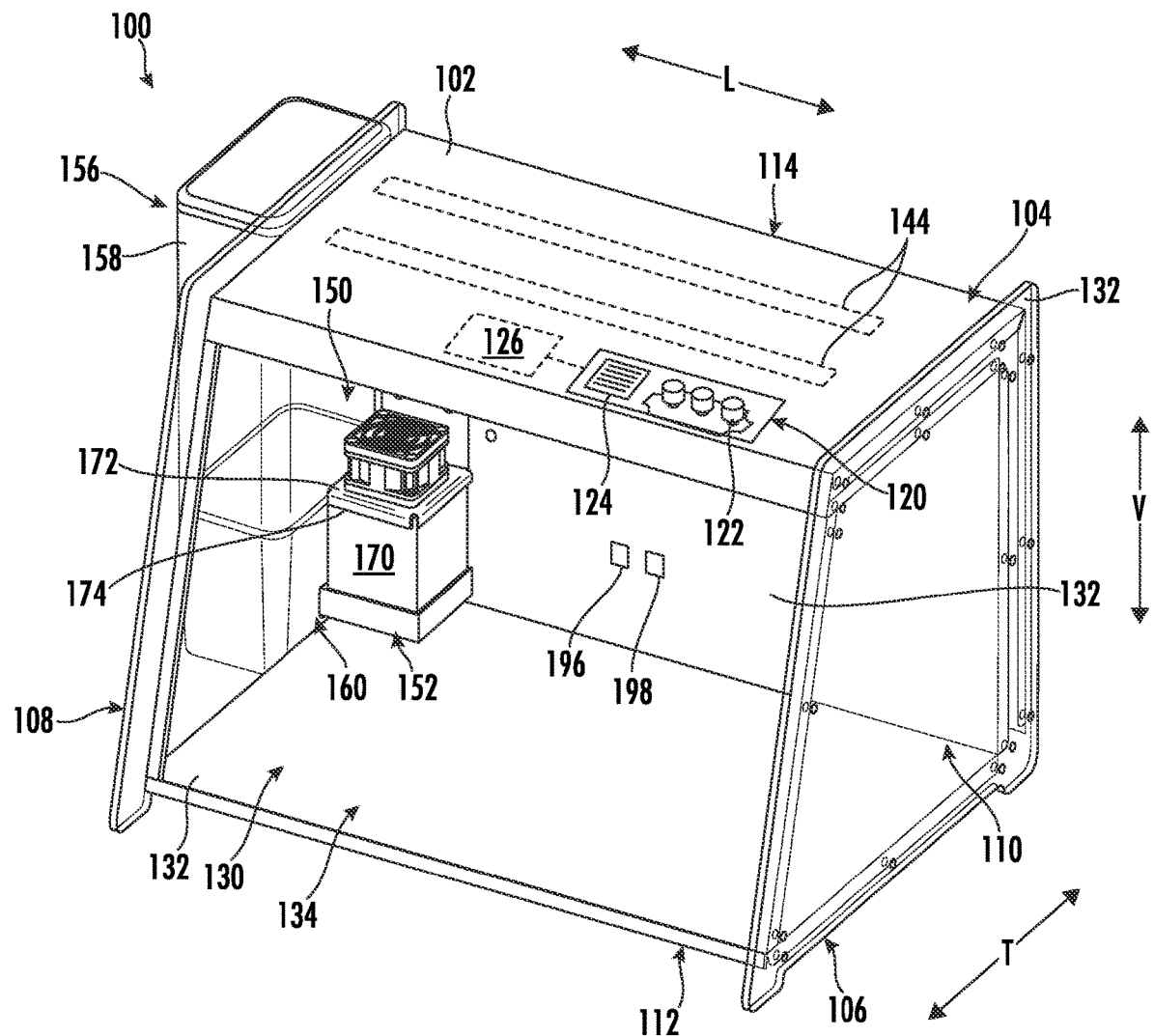
FIG. 1 provides a perspective view of a mushroom growing appliance with a door removed for clarity according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, an exemplary mushroom growing appliance will be described in accordance with exemplary aspects of the present subject matter. According to exemplary embodiments, mushroom growing appliance 100 includes a cabinet 102 that is generally configured for containing and/or supporting various components of mushroom growing appliance 100 and which may also define one or more internal chambers or compartments of mushroom growing appliance 100. In this regard, as used herein, the terms "cabinet," "housing," and the like are generally intended to refer to an outer frame or support structure for mushroom growing appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of mushroom growing appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, mushroom growing appliance 100 generally defines a vertical direction V, a lateral direction L, and a transverse direction T, each of which is mutually perpendicular, such that an orthogonal coordinate system is generally defined. Cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing mushroom growing appliance 100.

Referring again to FIG. 1, mushroom growing appliance 100 may include a control panel 120 that may represent a general-purpose Input/Output ("GPIO") device or functional block for mushroom growing appliance 100. In some embodiments, control panel 120 may include or be in operative communication with one or more user input devices 122, such as one or more of a variety of digital, analog, electrical, mechanical, or electro-mechanical input devices including rotary dials, control knobs, push buttons, toggle switches, selector switches, and touch pads. Additionally, mushroom growing appliance 100 may include a display 124, such as a digital or analog display device generally configured to provide visual feedback regarding the operation of mushroom growing appliance 100. For example, display 124 may be provided on control panel 120 and may include one or more status lights, screens, or visible indicators. According to exemplary embodiments, user input devices 122 and display 124 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Mushroom growing appliance 100 may further include or be in operative communication with a processing device or a controller 126 that may be generally configured to facilitate appliance operation. In this regard, control panel 120, user input devices 122, and display 124 may be in communication with controller 126 such that controller 126 may receive control inputs from user input devices 122, may display information using display 124, and may otherwise regulate operation of mushroom growing appliance 100. For example, signals generated by controller 126 may operate mushroom growing appliance 100, including any or all system components, subsystems, or interconnected devices, in response to the position of user input devices 122 and other control commands. Control panel 120 and other components of mushroom growing appliance 100 may be in communication with controller 126 via, for example, one or more signal lines or shared communication busses. In this manner, Input/Output ("I/O") signals may be routed between controller 126 and various operational components of mushroom growing appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 126 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 126 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 126 may be operable to execute programming instructions or micro-control code associated with an operating cycle of mushroom growing appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 126 as disclosed herein is capable of and may be operable to perform any methods, method steps, or portions of methods as disclosed herein. For example, in some embodiments, methods disclosed herein may be embodied in programming instructions stored in the memory and executed by controller 126.

The memory devices may also store data that can be retrieved, manipulated, created, or stored by the one or more processors or portions of controller 126. The data can include, for instance, data to facilitate performance of methods described herein. The data can be stored locally (e.g., on controller 126) in one or more databases and/or may be split up so that the data is stored in multiple locations. In addition, or alternatively, the one or more database(s) can be connected to controller 126 through any suitable network(s), such as through a high bandwidth local area network (LAN) or wide area network (WAN). In this regard, for example, controller 126 may further include a communication module or interface that may be used to communicate with one or more other component(s) of mushroom growing appliance 100, controller 126, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Within cabinet 102 is a grow chamber 130 configured for the receipt of one or more mushrooms or mushroom growing material, e.g., spores, soil, mushroom pods, etc. Although mushroom growing appliance 100 is described herein as being used to grow mushrooms, it should be appreciated that mushroom growing appliance 100 and aspects of the present subject matter may be applied to grow other items as well. For example, mushroom growing appliance 100 may be used to grow plants, algae, other fungi, or other living organisms. In addition, it should be appreciated that mushroom growing appliance 100 is provided by way of example only, and the construction of mushroom growing appliance 100 may vary while remaining within the scope of the present subject matter. In this regard, the example embodiment shown in the figures is not intended to limit the present subject matter to any appliance configuration or component arrangement.

Figure 2:
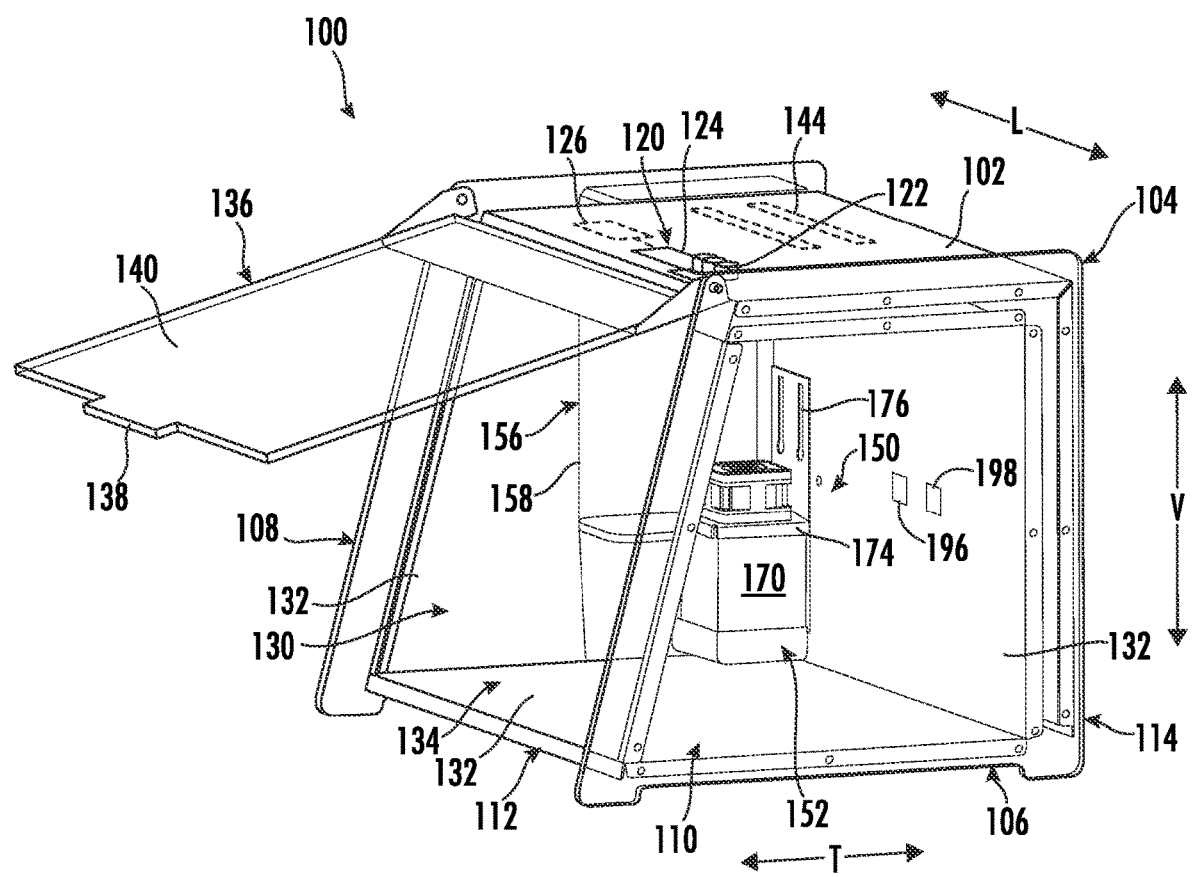
FIG. 2 provides a perspective view of the exemplary mushroom growing appliance of FIG. 1 with the door being moved toward an open position according to an exemplary embodiment of the present subject matter.
Figure 3:
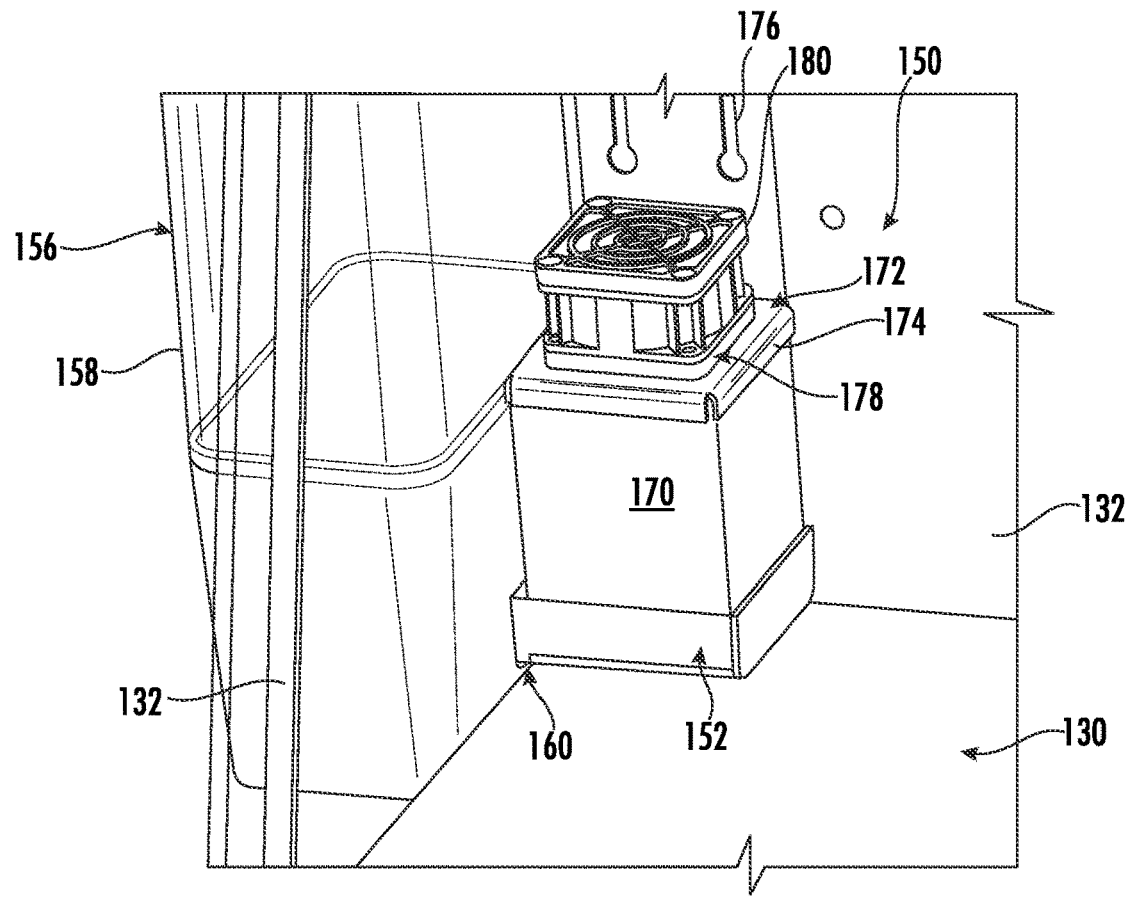
FIG. 3 provides a perspective view of a climate control system of the exemplary mushroom growing appliance of FIG. 1 according to an exemplary embodiment of the present subject matter.

As best illustrated in FIGS. 2 and 3, grow chamber 130 is defined by a plurality of chamber walls, identified generally herein by reference numeral 132. For example, grow chamber walls 132 include a top wall and a bottom wall which are spaced apart along the vertical direction V. In addition, a left sidewall and a right sidewall extend between the top wall and bottom wall and are spaced apart along the lateral direction L. A rear wall may additionally extend between the top wall and the bottom wall as well as between the left sidewall and the right sidewall. Collectively, chamber walls 132 may generally define an access opening 134 through which a user may access grow chamber 130, e.g., to add, remove, or manipulate mushrooms growing therein.

Referring still to FIGS. 1 and 2, mushroom growing appliance 100 includes a door 136 (removed in FIG. 1 for clarity) that is pivotally mounted to cabinet to permit selective access to grow chamber 130. For example, door 136 is illustrated as being mounted to a top of cabinet and is movable between a closed position and an open position (e.g., FIG. 2 illustrates door 136 as it is being pivoted to the open position). A handle 138 is mounted to door 136 to assist a user with opening and closing door 136 in order to access grow chamber 130. When door 136 is in the closed position, grow chamber 130 may be substantially sealed such that the growing environment therein may be regulated, e.g., to the desirable temperature, humidity, gas concentrations, etc. Door 136 may include a window 140, constructed for example from acrylic glass panes, to provide for viewing the contents grow chamber 130.

According to exemplary embodiments, mushroom growing appliance 100 may include additional features to facilitate regulation of a growing environment within grow chamber 130. For example, as explained in more detail below, mushroom growing appliance 100 may include subsystems for regulating chamber lighting, temperatures, humidity, gas concentrations, etc. Although exemplary subsystems are described herein, it should be appreciated that these subsystems are described only for the purpose of explaining aspects of the present subject matter. The present subject matter is not intended to be limited to the subsystems described, the configuration of such subsystems, etc.

As illustrated, mushroom growing appliance 100 may include a light assembly 144 which is generally configured for providing light into grow chamber 130 to facilitate the growth of mushrooms (not shown). As shown, light assembly 144 may include a plurality of light sources (not labeled) stacked in an array and mounted a top chamber wall 132 of grow chamber. More specifically, light assembly 144 may include a plurality of light strips that extend along the lateral direction L within the top chamber wall 132. Light assembly 144 may be mounted directly to top chamber wall 132 within grow chamber 130 or may alternatively be positioned behind top chamber wall 132 such that light is projected through a transparent window or light pipe into grow chamber 130. The position, configuration, and type of light sources described herein are not intended to limit the scope of the present subject matter in any manner.

Light assembly 144 may include any suitable number, type, position, and configuration of electrical light source(s), using any suitable light technology and illuminating in any suitable color. For example, according to the illustrated embodiment, light assembly 144 includes one or more light emitting diodes (LEDs), which may each illuminate in a single color (e.g., white LEDs), or which may each illuminate in multiple colors (e.g., multi-color or RGB LEDs) depending on the control signal from a controller. However, it should be appreciated that according to alternative embodiments, light assembly 144 may include any other suitable traditional light bulbs or sources, such as halogen bulbs, fluorescent bulbs, incandescent bulbs, glow bars, a fiber light source, etc.

Referring now generally to FIGS. 1 through 8, mushroom growing appliance 100 further includes a climate control system 150 that is generally configured for regulating a grow environment or climate within grow chamber 130. In general, climate control system 150 may regulate the temperature, humidity, gas concentrations, and other aspects of grow chamber 130 to facilitate mushroom growth. Climate control system 150 will be described in more detail below according to exemplary embodiments. However, it should be appreciated that the specific construction and operation of climate control system 150 described herein is not intended to be limiting in any manner.

According to exemplary embodiments the present subject matter, climate control system 150 may generally be configured for selectively humidifying or adding moisture to grow chamber 130. In this regard, according to the illustrated embodiment, climate control system 150 may include a water reservoir 152 that is positioned within grow chamber 130 for receiving water (e.g., as identified generally by reference numeral 154 in FIG. 8). According to the illustrated embodiment, mushroom growing appliance 100 may further include a water supply system 156 for selectively filling water reservoir 152 with water 154. In this regard, for example, water supply system 156 may include a water storage tank 158 that is mounted to a side of cabinet 102 and which is fluidly coupled to water reservoir 152 through a water supply opening 160 that is defined through cabinet 102. In general, water storage tank 158 is configured for replenishing water 154 in water reservoir 152 as it is used by climate control system 150.

According to exemplary embodiments, the water storage tank 158 is mounted adjacent to the cabinet 102 above the water reservoir 152. In this manner, gravity aids in maintaining a consistent level of water in the water reservoir 152 without the need for the user to monitor this level and without the need for the user to replenish the water in the water reservoir 152 or the water supply tank 158 daily.

In example embodiments, the water storage tank 158 has an internal volume not less than two hundred and fifty milliliters (0.25 L), not less than five hundred milliliters (0.5 L), not less than one liter (1 L), or not less than two liters (2 L), etc. In example embodiments, the water storage tank has an internal volume between two hundred and fifty milliliters and two liters. In example embodiments, the water storage tank 158 has an internal volume adapted to contain enough water to support operation of the mushroom growing appliance for at least two (2) days, at least three (3) days, at least four (4) days, at least five (5) days, at least six (6) days, or at least seven (7) days, under typical operating conditions without the need to replenish the water in the water storage tank 158.

Further details of water supply system 156 are omitted herein for brevity. However, it should be appreciated that water supply system 156 may include any suitable plumbing, valves, or flow regulating devices to facilitate proper filling of water 154 within water reservoir 152. Climate control system 150 may further include a wicking filter 170 that is positioned at least partially within water reservoir 152 for wicking water 154 stored in water reservoir 152 up into wicking filter 170. In general, wicking filter may be any suitable device that is suitable for filtering air and/or wicking water from a water source. For example, according to an exemplary embodiment, wicking filter includes an internal wicking sponge surrounded by (or wrapped in) a prefilter. In this manner, as described in more detail below, the prefilter may be particularly suitable for filtering dust, mushroom spores, and other particulates floating in air passing therethrough. The internal wicking sponge may be a honeycomb shaped paper material particularly suited for wicking water 154 up into wicking filter 170, e.g., to facilitate a humidification process as described herein. For example, according to exemplary embodiments, wicking filter 170 may be a Honeywell® Humidifier Wicking Filter. According to the illustrated embodiment, wicking filter 170 has the shape of a rectangular cuboid, which may be particularly suitable for facilitating the airflows described below. However, it should be appreciated that wicking filter 170 may have any suitable size, shape, and configuration while remaining within scope the present subject matter.

Figure 4:
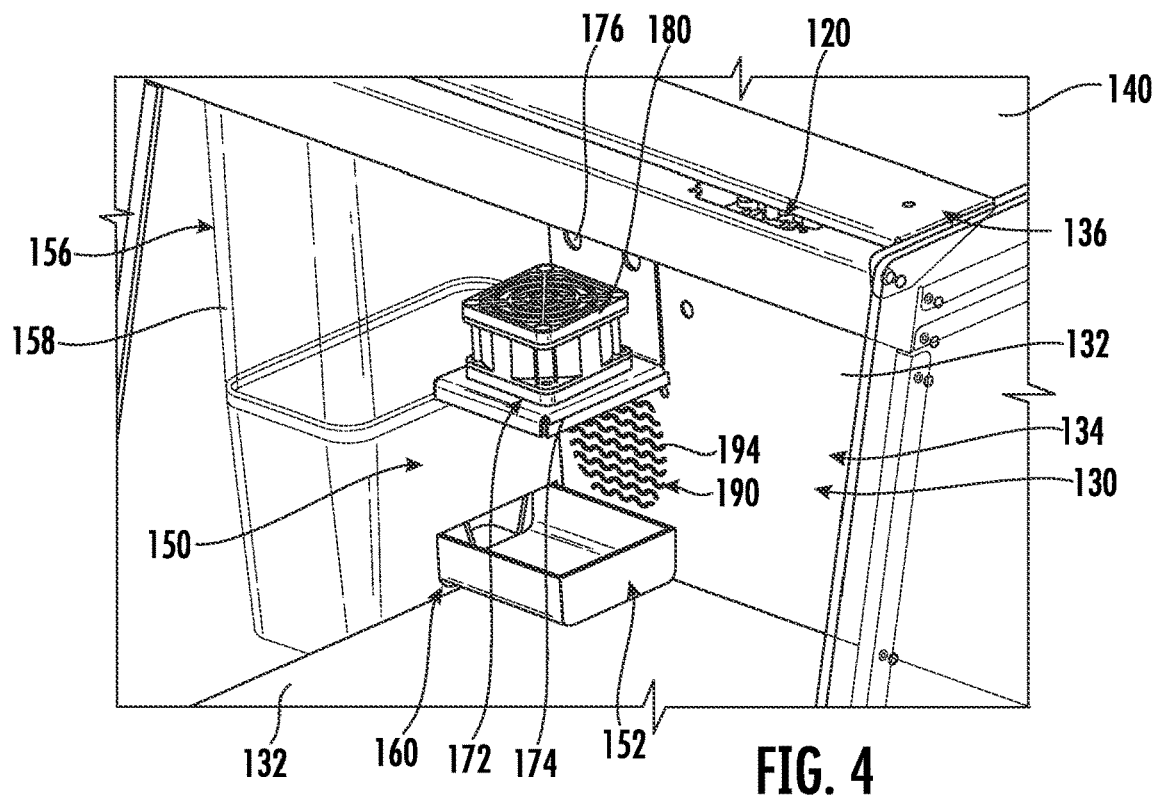
FIG. 4 provides a perspective view of the exemplary climate control system of FIG. 3 with a wicking filter removed for clarity.
Figure 5:
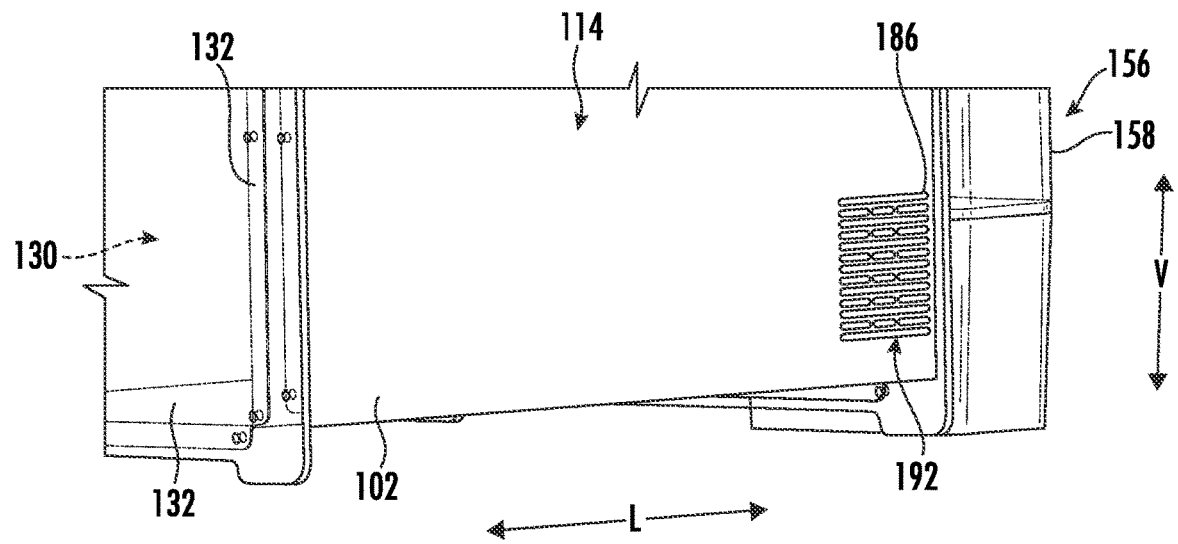
FIG. 5 provides a rear, perspective view of the exemplary mushroom growing appliance of FIG. 1 according to an exemplary embodiment of the present subject matter.
Figure 6:
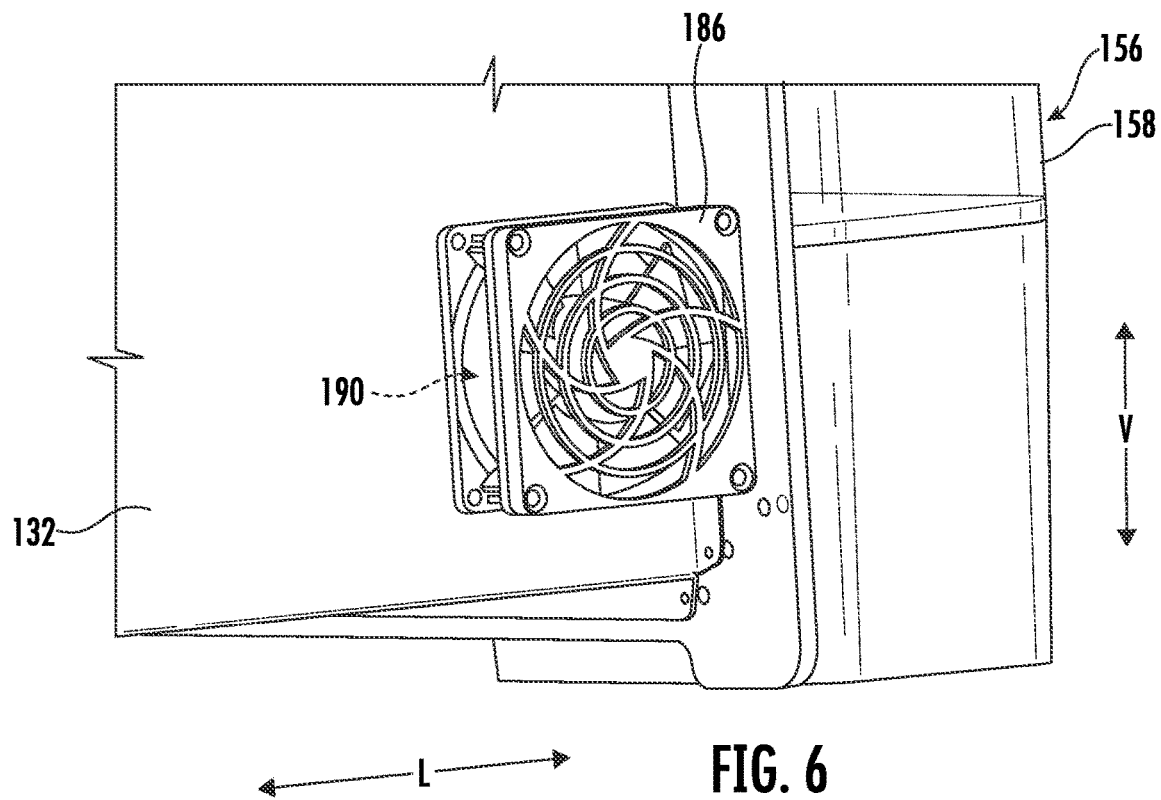
FIG. 6 provides a rear, perspective view of the exemplary mushroom growing appliance of FIG. 1 with a rear panel of the cabinet removed according to an exemplary embodiment of the present subject matter.

As best shown in FIG. 4, where wicking filter 170 is removed for clarity, climate control system 150 may further include a filter retention bracket 172 that is mounted to a rear chamber wall 132 for receiving and securing wicking filter 170. More specifically, filter retention bracket 172 may include a plurality of retention flanges 174 that extend downward for receiving a top end of wicking filter 170 along the vertical direction V. In addition, as illustrated, filter retention bracket 172 may be mounted to rear chamber wall 132 by one or more alignments slots 176 and mechanical fasteners (not shown) such that it is slidable along the vertical direction. In this regard, in order to replace wicking filter 170, a user may loosen the mechanical fasteners that secure filter retention bracket 172 to rear chamber wall 132. The user may then slide filter retention bracket 172 upward along the vertical direction V and place a new or cleaned wicking filter 170 into water reservoir 152. The user may then slide filter retention bracket 172 back onto wicking filter 170 and secure it with the mechanical fasteners such that retention flanges 174 secure the top end of wicking filter 170.

Filter retention bracket 172 may further define a recirculation aperture (e.g., as identified by reference numeral 178 in FIG. 8) through which a flow of air may pass. As shown, a recirculation fan 180 may be positioned adjacent the wicking filter 170 for selectively urging a flow of recirculation air (e.g., as identified generally by reference numeral 182 in FIG. 8) through wicking filter 170. More specifically, recirculation fan 180 may be mounted directly to filter retention bracket 172 over recirculation aperture 178. In this manner, all air driven by recirculation fan 180 may pass from grow chamber 130, through wicking filter 170, through recirculation aperture 178, and back into grow chamber 130. More specifically, as shown, recirculation fan 180 may be positioned on top of wicking filter 170, e.g., opposite water reservoir 152 such that the flow of recirculation air 182 is drawn up through an entire height of wicking filter 170 to extract more moisture from wicking filter 170 into the flow of recirculation air 182.

Notably, as explained above, as mushrooms grow within grow chamber 130, the mushrooms may give off carbon dioxide, resulting in elevated concentrations of carbon dioxide within grow chamber 130. Climate control system 150 may further include features for regulating these levels of carbon dioxide. Specifically, referring now to FIGS. 4 through 8, climate control system 150 may include a fresh air fan 186 for urging a flow of fresh air (e.g., identified generally by reference numeral 188 in FIG. 8) into grow chamber 130. By selectively urging the flow of fresh air 188 into grow chamber 130, fresh air fan 186 may decrease the concentration of carbon dioxide within grow chamber 130.

Specifically, according to the illustrated embodiment, rear chamber wall 132 of grow chamber 130 may define an air intake 190 through which ambient air from outside of mushroom growing appliance 100 may enter grow chamber 130. According to the illustrated embodiment, wicking filter 170 is seated directly over air intake 190 such that the flow of fresh air 188 entering grow chamber 130 is filtered as it passes into grow chamber 130. Accordingly, air intake 190 may generally be positioned between filter retention bracket 172 and water reservoir 152 along the vertical direction V. In this manner, external contaminants may be removed to ensure a more controlled climate within grow chamber 130.

Figure 7:
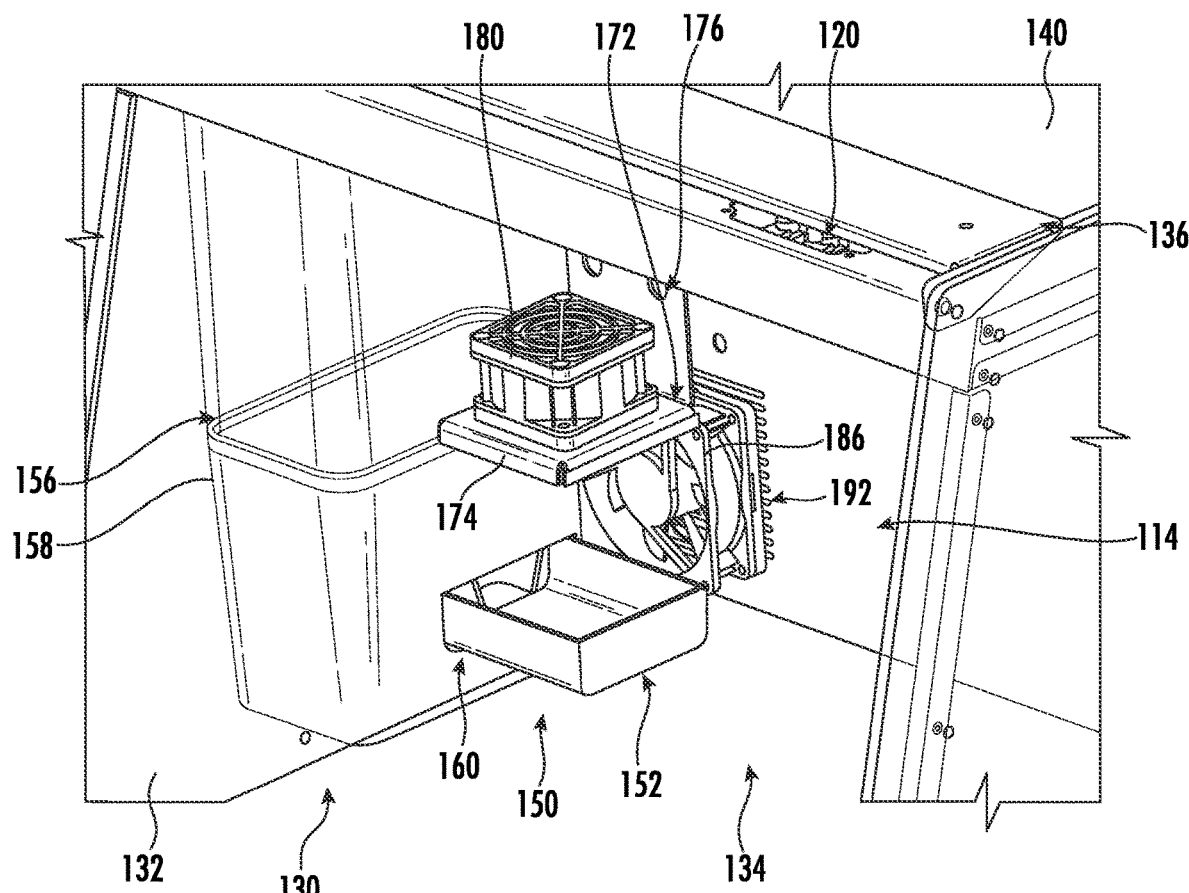
FIG. 7 provides a front, perspective view of the exemplary mushroom growing appliance of FIG. 1 with a rear chamber wall of the grow chamber removed according to an exemplary embodiment of the present subject matter.
Figure 8:
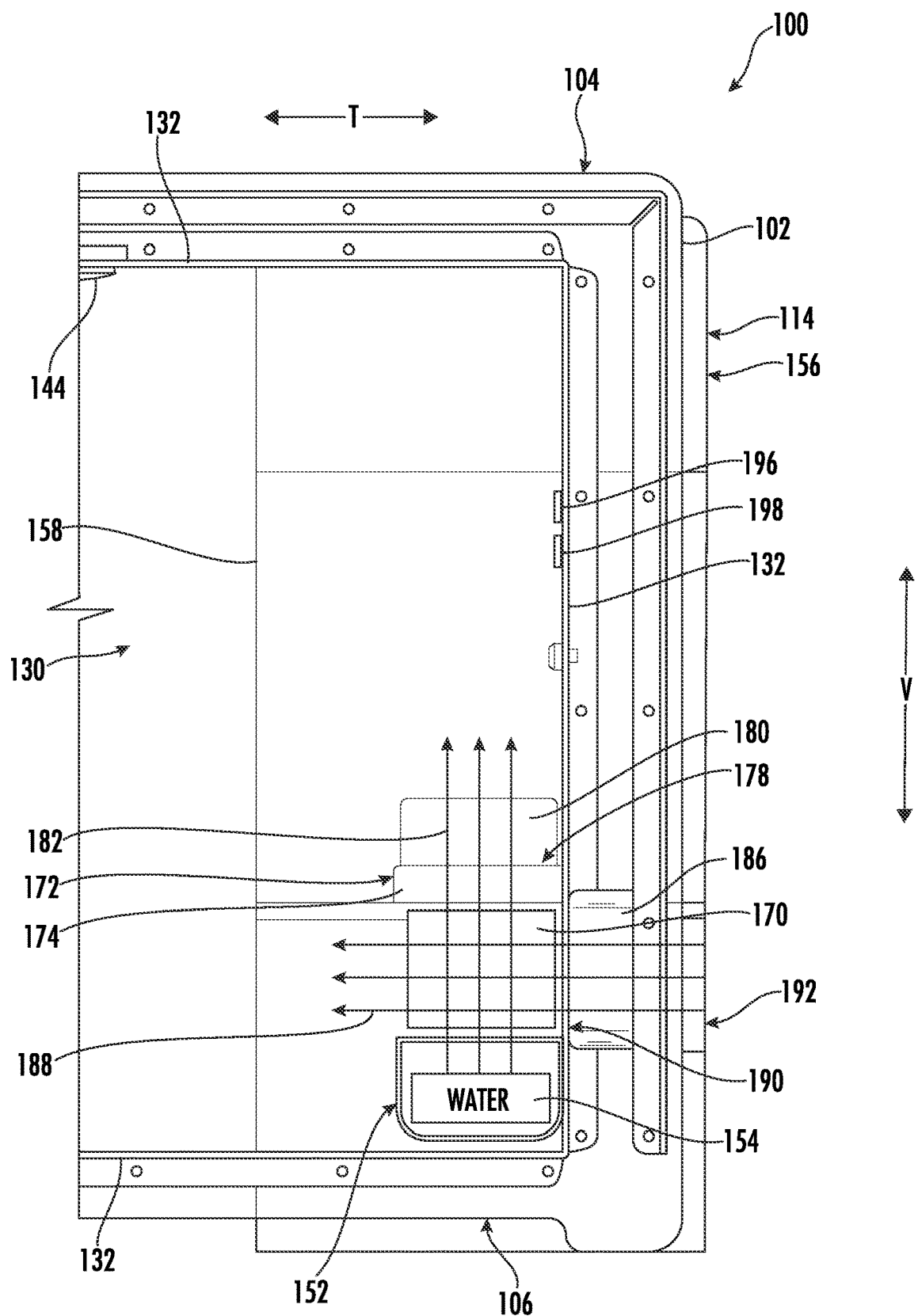
FIG. 8 provides a side, schematic view of the exemplary mushroom growing appliance of FIG. 1 along with the exemplary air flows within the grow chamber according to an exemplary embodiment of the present subject matter.

According to the illustrated embodiment, fresh air fan 186 may be positioned over air intake 190, e.g., between rear chamber wall 132 of grow chamber 130 and rear 114 of cabinet 102 (see, e.g., FIG. 7, where rear chamber wall 132 is removed for clarity). Moreover, cabinet 102 may define a cabinet opening 192 directly adjacent air intake 190. In addition, rear chamber wall 132 may include a plurality of restrictive baffles 194 that extend across air intake 190 to restrict the flow of fresh air 188 passing therethrough. In this manner, the flow of fresh air 188 is restricted sufficiently to prevent large amounts of air from being drawn in by recirculation fan 180, while also permitting fresh air fan 186 to urge the flow of fresh air 188 from the outside into grow chamber 130.

According to exemplary embodiments, climate control system 150 may further include one or more sensors for monitoring the environment or climate within grow chamber 130 and taking corrective action to adjust the climate as desired. For example, according to the illustrated embodiment, climate control system 150 may further include a gas sensor 196 that is positioned within grow chamber 130 and is generally configured for measuring the concentration of carbon dioxide (or other gases) in grow chamber 130. In this regard, controller 126 may generally be in operative communication with gas sensor 196 and may be used to monitor the concentration of carbon dioxide (or other gases) using gas sensor 196. Controller 126 may be further configured to determine that the concentration of carbon dioxide has exceeded a predetermined carbon dioxide threshold and operate the fresh air fan 186 to supplement the grow chamber 130 with the flow of fresh air 188 as needed to adjust the undesirable gas concentration.

Similarly, climate control system 150 may include a humidity sensor 198 that is positioned within grow chamber 130 for measuring a chamber humidity within grow chamber 130. Controller 126 may be in operative communication with humidity sensor 198 for monitoring the chamber humidity. The controller may be further configured to determine that the chamber humidity is below a predetermined humidity threshold (e.g., a desired committee for mushroom growth) and may operate the recirculation fan 180 to circulate the flow of recirculation air 182 within grow chamber 130. In this manner, as the flow of recirculation air 182 is drawn up through wicking filter 170, the flow of recirculation air 182 may extract moisture and become humidified before being discharged back into grow chamber 130.

As explained above, aspects of the present subject matter are directed to a mushroom growing appliance and methods of operating the same to create an airflow path that can use the wicking/humidification media as both a filter and wick for both the recirculation and fresh air fan. The airflow may be achieved by placing two fans perpendicular to a block of wicking media in the base of a water reservoir. The wicking material can pull water up to the top where the recirculation fan can humidify the grow chamber and the fresh air fan can push air through the media to humidify and add fresh air to the unit. This method permits the chamber to keep high levels of humidity at all times and to reduce the accumulation of carbon dioxide in the mushroom growing appliance as this is a common byproduct in the mushroom growing process. In addition, the unit is kept clean by sucking fallen spores along with the airflow path into the wicking media that can easily be changed by the user as a consumable, acting as a filter for the recirculation side of the unit. In addition, the fresh air fan will push air through the media and any outside contaminants will also be caught in this same humidification media acting as a filter for the inlet side of the unit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A mushroom growing appliance comprising:
   a cabinet;
   a grow chamber defined within the cabinet;
   a water reservoir positioned within the grow chamber for receiving water;
   a water supply system comprising a water storage tank that is mounted adjacent the cabinet above the water reservoir, wherein the water storage tank is fluidly coupled to the water reservoir through a water supply opening defined through the cabinet;
a wicking filter positioned at least partially within the water reservoir for wicking the water into the wicking filter; and
a recirculation fan positioned on top of the wicking filter opposite the water reservoir for selectively urging a flow of recirculation air vertically through the wicking filter and back into the grow chamber.

2. The mushroom growing appliance of claim 1, wherein the wicking filter comprises an internal wicking sponge surrounded by a prefilter.

3. The mushroom growing appliance of claim 1, wherein the water supply system further comprises an automatic valve fluidly coupled to the water storage tank and the water supply opening and adapted to maintain a consistent level of water in the water reservoir without user input.

4. The mushroom growing appliance of claim 1, wherein the internal volume of the water storage tank is no less than a half liter.

5. The mushroom growing appliance of claim 1, further comprising a filter retention bracket defining a recirculation aperture and being configured for receiving a top end of the wicking filter, wherein the recirculation fan is mounted directly to the filter retention bracket over the recirculation aperture.

6. The mushroom growing appliance of claim 1, further comprising:
a fresh air fan for urging a flow of fresh air into the grow chamber.

7. The mushroom growing appliance of claim 6, further comprising:
a gas sensor for measuring a concentration of carbon dioxide in the grow chamber; and
a controller operably coupled to the gas sensor and the fresh air fan, the controller being configured to:
monitor the concentration of carbon dioxide using the gas sensor;
determine that the concentration of carbon dioxide has exceeded a predetermined carbon dioxide threshold; and
operate the fresh air fan to supplement the grow chamber with the flow of fresh air.

8. The mushroom growing appliance of claim 1, further comprising:
a humidity sensor for measuring a chamber humidity in the grow chamber; and
a controller operably coupled to the humidity sensor and the recirculation fan, the controller being configured to:
monitor the chamber humidity using the humidity sensor;
determine that the chamber humidity has dropped below a predetermined humidity threshold; and
operate the recirculation fan to circulate the flow of recirculation air within the grow chamber.

9. A climate control system for a mushroom growing appliance, the mushroom growing appliance comprising a grow chamber defined within a cabinet, the climate control system comprising:
a water reservoir positioned within the grow chamber for receiving water;
a wicking filter positioned at least partially within the water reservoir for wicking the water into the wicking filter;
a water supply system comprising a water storage tank that is mounted adjacent the cabinet above the water reservoir, the water storage tank fluidly coupled to the water reservoir through a water supply opening defined through the cabinet;
a recirculation fan positioned on top of the wicking filter opposite the water reservoir for selectively urging a flow of recirculation air vertically through the wicking filter and back into the grow chamber; and
a fresh air fan positioned adjacent the wicking filter for urging a flow of fresh air through the wicking filter and into the grow chamber.

10. The climate control system of claim 9, wherein the water supply system further comprises an automatic valve fluidly coupled to the water storage tank and the water supply opening and adapted to maintain a consistent level of water in the water reservoir without user input.

11. The climate control system of claim 9, wherein an internal volume of the water storage tank is no less than a half liter.

12. The climate control system of claim 9, further comprising:
a filter retention bracket defining a recirculation aperture and being configured for receiving a top end of the wicking filter, wherein the recirculation fan is mounted directly to the filter retention bracket over the recirculation aperture.

13. The climate control system of claim 9, wherein a rear chamber wall of the grow chamber defines an air intake, wherein the fresh air fan is positioned adjacent the air intake between the rear chamber wall and the cabinet, and wherein the wicking filter is seated over the air intake to filter the flow of fresh air entering the grow chamber.

14. The climate control system of claim 9, further comprising:
a gas sensor for measuring a concentration of carbon dioxide in the grow chamber; and
a controller operably coupled to the gas sensor and the fresh air fan, the controller being configured to:
monitor the concentration of carbon dioxide using the gas sensor;
determine that the concentration of carbon dioxide has exceeded a predetermined carbon dioxide threshold; and
operate the fresh air fan to supplement the grow chamber with the flow of fresh air.

15. The climate control system of claim 9, further comprising:
a humidity sensor for measuring a chamber humidity in the grow chamber; and
a controller operably coupled to the humidity sensor and the recirculation fan, the controller being configured to:
monitor the chamber humidity using the humidity sensor;
determine that the chamber humidity has dropped below a predetermined humidity threshold; and
operate the recirculation fan to circulate the flow of recirculation air within the grow chamber.

16. A method for controlling an environment within a mushroom growing appliance, the method comprising:
receiving, via a water storage tank, water in a water reservoir, the water reservoir positioned within a grow chamber defined within a cabinet, wherein the water storage tank is mounted adjacent the cabinet and above the water reservoir;
wicking water into a water filter positioned at least partially within the water reservoir;
selectively urging, via a recirculation fan positioned on top of the wicking filter opposite the water reservoir, a flow of recirculation air vertically through the wicking filter and back into the grow chamber.

17. The method for controlling the environment within the mushroom growing appliance of claim 16, the method further comprising:

urging, via a fresh air fan positioned adjacent the wicking filter, a flow of fresh air through the wicking filter and into the grow chamber.

18. The method for controlling the environment within the mushroom growing appliance of claim 17, the method further comprising:

measuring, via a gas sensor, a concentration of carbon dioxide in the grow chamber;

monitoring, via a controller operably coupled to the gas sensor and the fresh air fan, the concentration of carbon dioxide;

determining, via the controller, that the concentration of carbon dioxide has exceeded a predetermined carbon dioxide threshold; and operating the fresh air fan to supplement the grow chamber with the flow of fresh air.

19. The method for controlling the environment within the mushroom growing appliance of claim 16, the method further comprising:

maintaining, via an automatic valve fluidly coupled to the water storage tank and the water reservoir, a consistent level of water in the water reservoir without user input.

20. The method for controlling the environment within the mushroom growing appliance of claim 16, the method further comprising:

measuring, via a humidity sensor, a chamber humidity in the grow chamber;

monitoring, via a controller operably coupled to the humidity sensor and the recirculation fan, the chamber humidity;

determining, via the controller, that the chamber humidity has dropped below a predetermined humidity threshold; and operating the recirculation fan to circulate the flow of recirculation air within the grow chamber.

* * * * *